(12) United States Patent
Ishida

(10) Patent No.: US 6,365,815 B2
(45) Date of Patent: Apr. 2, 2002

(54) FUNCTION GUIDE IN ELECTRONIC MUSICAL INSTRUMENT

(75) Inventor: Tadayuki Ishida, Hamamatsu (JP)

(73) Assignee: Kabushiki Kaisha Kawai Gakki Seisakusho, Hamumatsu (JP)

( * ) Notice: Subject to any disclaimer, the term of this patent is extended or adjusted under 35 U.S.C. 154(b) by 0 days.

(21) Appl. No.: 09/825,735

(22) Filed: Apr. 3, 2001

(30) Foreign Application Priority Data

Apr. 4, 2000 (JP) ........................................ 2000-102335
Apr. 11, 2000 (JP) ........................................ 2000-109777

(51) Int. Cl.⁷ ............................................. G09B 15/08
(52) U.S. Cl. ........................................ 84/478; 345/708
(58) Field of Search ................................ 345/336, 338, 345/705–714; 84/470

(56) References Cited

U.S. PATENT DOCUMENTS

| | | | | |
|---|---|---|---|---|
| 5,361,672 A | * | 11/1994 | Koyama | ............... 345/338 X |
| 5,399,800 A | * | 3/1995 | Morita et al. | |
| 5,710,898 A | * | 1/1998 | Tozuka | ............... 345/338 |
| 5,936,611 A | * | 8/1999 | Yoshida | |
| 6,188,009 B1 | * | 2/2001 | Saito et al. | |
| 6,211,452 B1 | * | 4/2001 | Haruyama | |

* cited by examiner

*Primary Examiner*—Jeffrey Donels
(74) *Attorney, Agent, or Firm*—Christie, Parker & Hale, LLP

(57) ABSTRACT

An explanation for a function selected for a help display is displayed in text on a display screen, and a light-emitting element disposed to correspond to a switch for performing the selected function is operated to blink or light, so that the trouble of finding an operation element when a desired function is performed can be reduced.

18 Claims, 14 Drawing Sheets

FIG. 9

| IDENTIFICATION CODE | FUNCTION | BLINKED LED |
|---|---|---|
| 000 | DEMO | LED1 |
| 001 | METRONOME | LED2 |
| 002 | TRANSPOSE | LED3,LED4 |
| 003 | OCTAVE SHIFT | LED5,LED6 |
| 004 | TEMPO | LED7,LED8 |
| 005 | EFFECT | LED9 |
| 006 | TUNING | LED9,LED20 |
| 007 | CHORUS | LED10 |
| 008 | LOCAL CONTROL | LED10,LED20 |
| 009 | HARMONY | LED11 |
| 010 | FILL IN | LED12,LED13,LED14,LED15 |
| 011 | SYSTEM | LED16 |
| 012 | DISK | LED17 |
| . | . | . |
| . | . | . |
| 025 | FUNCTION KEY | LED20 |
| . | . | . |
| . | . | . |
| 127 | SONG SELECT | LED160 |

FIG. 14

| IDENTIFICATION CODE | FUNCTION |
|---|---|
| 000 | DEMO |
| 001 | METRONOME |
| 002 | TRANSPOSE |
| 003 | OCTAVE SHIFT |
| 004 | TEMPO |
| 005 | EFFECT |
| 006 | TUNING |
| 007 | CHORUS |
| 008 | LOCAL CONTROL |
| 009 | HARMONY |
| 010 | FILL IN |
| 011 | SYSTEM |
| 012 | DISK |
| . | . |
| . | . |
| 025 | FUNCTION KEY |
| . | . |
| . | . |
| 127 | SONG SELECT |

FUNCTION GUIDE IN ELECTRONIC MUSICAL INSTRUMENT

CROSS-REFERENCE TO RELATED APPLICATIONS

This application is based upon and claims priority of Japanese Patent Application Nos. 2000-102335, filed on Apr. 4, 2000 and 2000-109777, filed on Apr. 11, 2000, the contents being incorporated herein by reference.

BACKGROUND OF THE INVENTION

1. Field of the Invention

The present invention relates to a function guide system in an electronic musical instrument, a function guide method in an electronic musical instrument, and a storage medium, in particular, suitable for easily showing a user the location of an operation element for performing a function selected through a help function.

2. Description of the Related Art

Generally, in an electronic musical instrument, a detailed explanation for a function assigned for each of the panel switches (or buttons) is given in a manual for a user to look into it. However, in a personal computer or a word processor, that with a help function has generally come into use.

Herein, in an electronic musical instrument, where various functions provided are explained using a help function, has also come into use. The help function is a function where an operation mode is changed to a help mode by a predetermined operation such as pressing a help key and so on to display on a screen of a display device all or a part of the function names provided in the electronic musical instrument, and when one of the function names is selected, an explanation for the function is displayed.

Since functions of an electronic musical instrument in recent years have been diversified, the number of switches having various functions and the number of operation modes have been increasing. In addition, each of these switches usually has a different function in each operation mode.

Furthermore, among many switches provided, some realize a single function in a single use, and some realize a different function when pressed together with a different switch. For example, an electronic musical instrument has appeared where by pressing certain switch (a keyboard key is sometimes used) while pressing a shift key, a different function is performed from that performed when the switch is pressed by itself.

In such an electronic musical instrument, only by providing the help function as described above and displaying a list of the switches and the functions, a switch for performing a corresponding function can not often be located in the electronic musical instrument, and therefore a great deal of effort is required to perform a desired function.

SUMMARY OF THE INVENTION

In consideration of the above, the object of the present invention is to make it easy to show a user the location of an operation element for performing a desired function in an electronic musical instrument having a plurality of operation elements with different functions.

Another object of the present invention is to make it easy to show a user the location of an operation element for performing a function selected for a help display on a screen in an electronic musical instrument having a plurality of operation elements with different functions.

From a viewpoint of the present invention, a function guide system in an electronic musical instrument is provided wherein an explanation for a function selected for a help display is displayed on a display screen in text while a light-emitting element disposed corresponding to a switch for performing the selected function is blinked or lighted.

From another viewpoint of the present invention, a function guide system in an electronic musical instrument is provided wherein, when a function selected for a help display is explained, a panel view screen showing a text and the arrangement of operation elements on a panel is displayed on a display device while a display state of an operation element for performing the function selected above is differentiated from that of other operation elements.

BRIEF DESCRIPTION OF THE DRAWINGS

FIG. 9 is a table showing how respective identification codes, functions, and blinked LEDs correspond to each other;

FIG. 14 is a table showing how respective identification codes, functions, and blinked LEDs correspond to each other.

DETAILED DESCRIPTION OF THE PREFERRED EMBODIMENTS

Next, a function guide system in an electronic musical instrument, and a function guide method and a storage medium of an electronic musical instrument are described referring to the attached drawings.

First Embodiment

Figure 1:
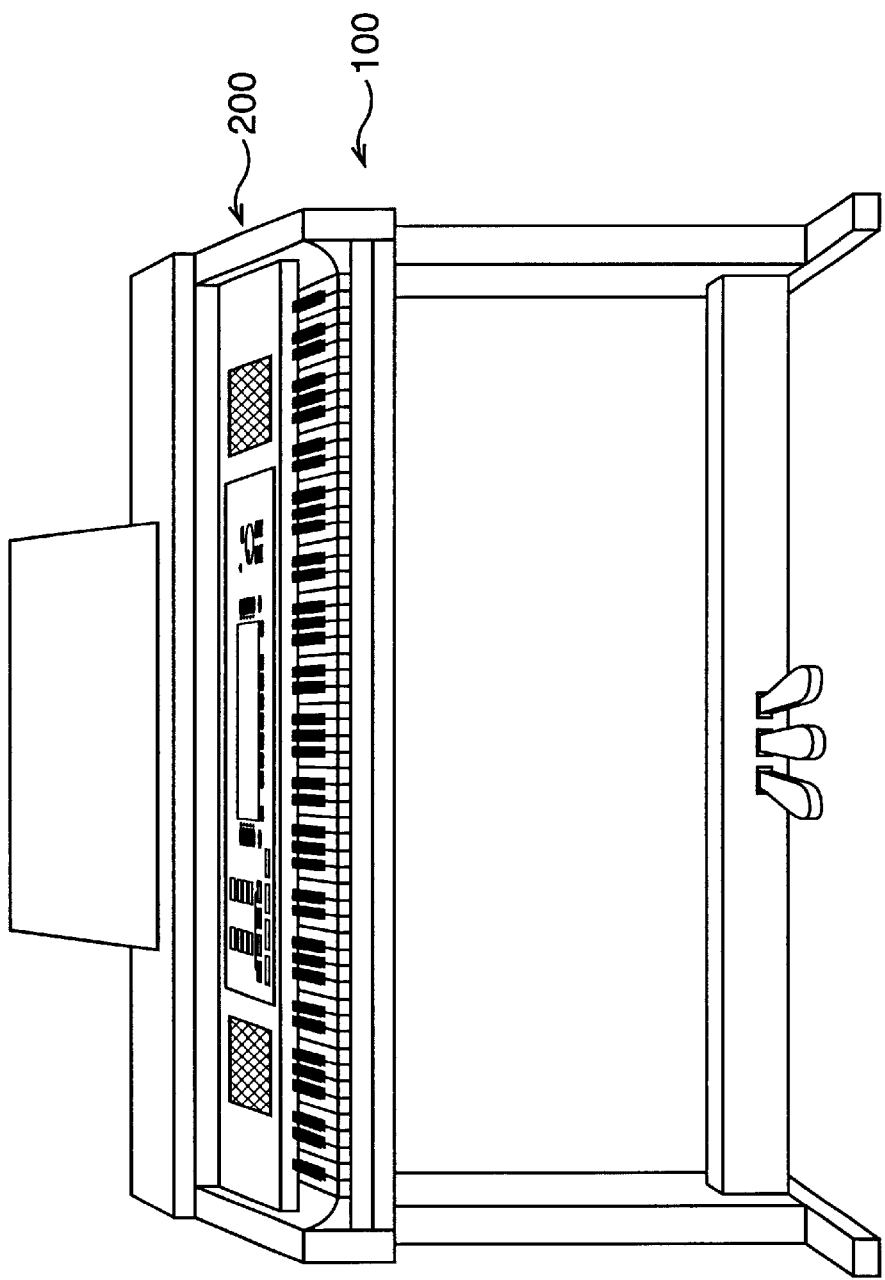
FIG. 1 is a perspective view of an electronic piano showing an example of an electronic musical instrument according to the first embodiment of the present invention.

FIG. 1 is a view showing an appearance of an electronic piano showing an example of an electronic musical instrument according to the first embodiment of the present invention.

As shown in FIG. 1, an operation panel 200 is provided in an upper front section of the electronic piano 100 in this embodiment. On the operation panel 200 a display device 21 composed of a liquid crystal display (LCD) and many operation elements are arranged to provide many functions as shown in a detailed explanatory view in FIG. 2. Therefore, in order to make efficient use of these functions, a help function is provided in the electronic piano 100 in this embodiment.

The help function can transfer a mode to a help operation mode when a help switch 37 is pressed. In other words, when the help switch 37 is pressed, a function list is displayed on a screen of the display device 21. When the function list is displayed on the screen, a select button 22 or dial 23 is operated to select a desired function.

Figure 3:
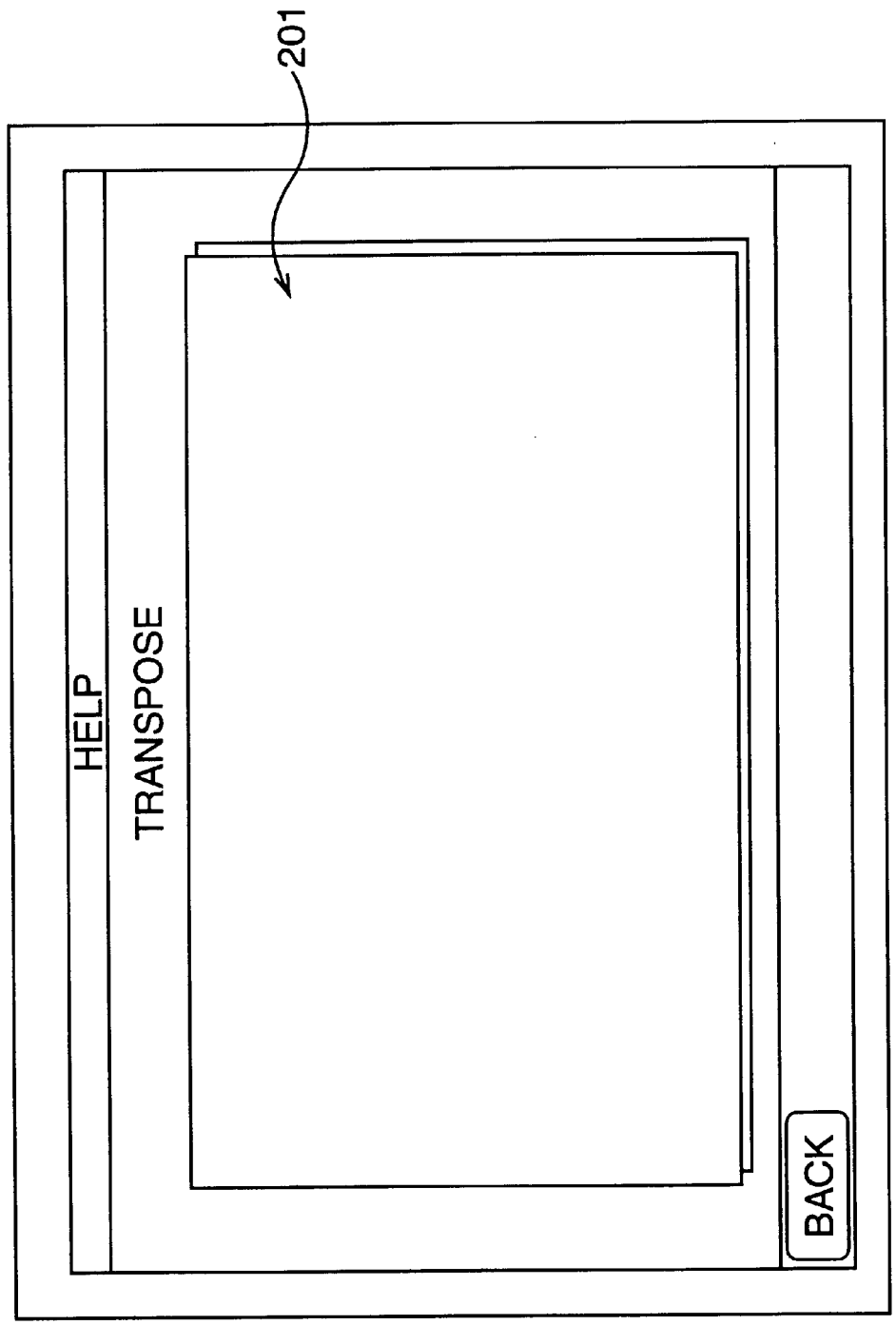
FIG. 3 is a view showing a display example of a display device.

When a function is selected from a plurality of functions displayed on the display device 21 by the operation of the select button 22 or dial 23, the screen of the display device 21 changes to a screen shown in FIG. 3, which is a screen for displaying an explanation for the selected function in text.

As shown in FIG. 3, on a display area 201 of the display device 21 an explanation for a (transpose) function is displayed in text. The process so far is a help function display conventionally performed in general, but in this embodiment, light-emitting diodes (LED) are disposed corresponding to the respective operation switches for performing the respective functions displayed on the display area 201, and the corresponding LED is operated to blink.

In this way, a user can know the location of the corresponding function switch visually so that the trouble of finding a desired operation element in the electronic musical instrument with many operation switches disposed therein is eliminated.

Figure 4:
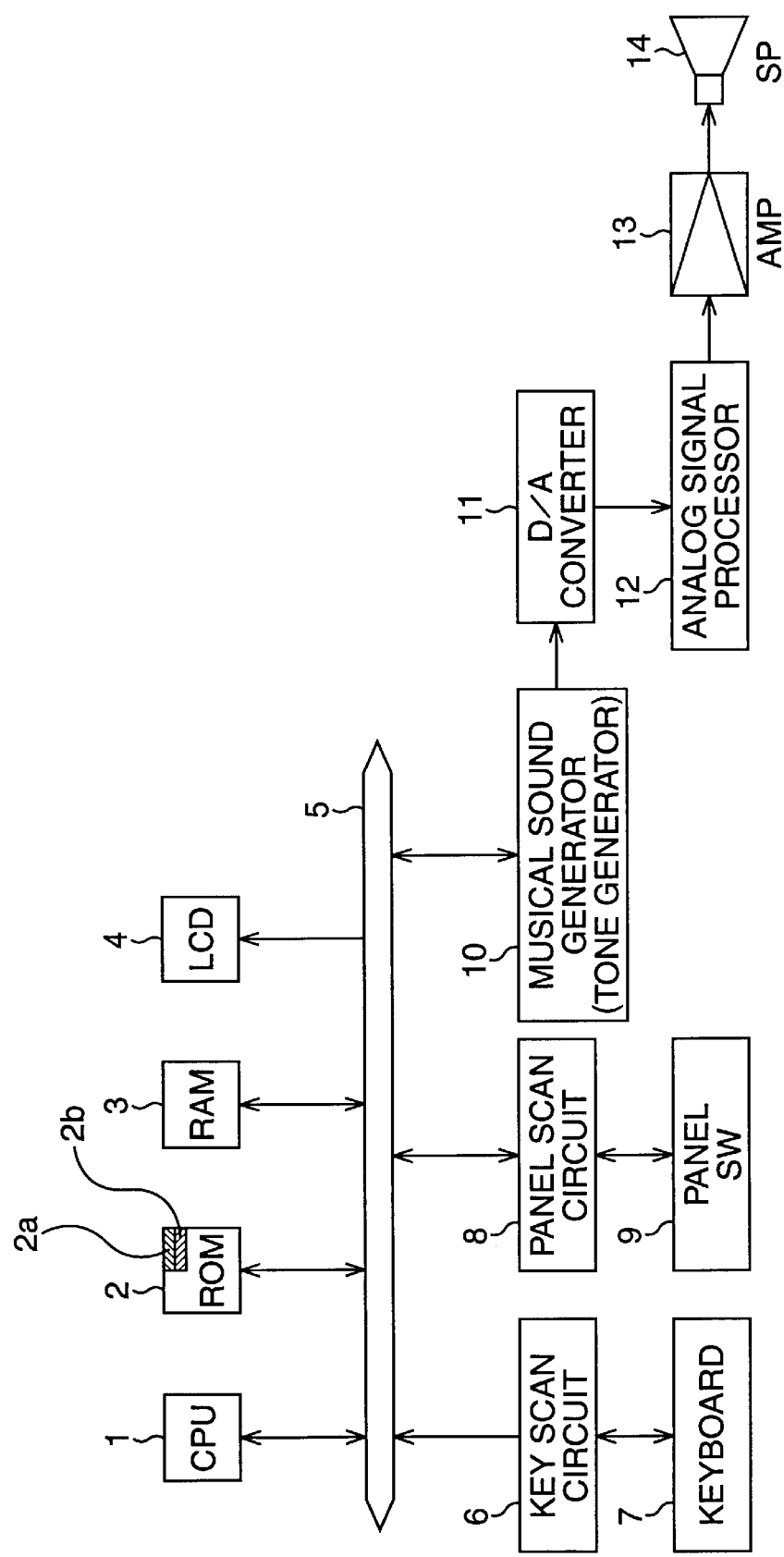
FIG. 4 is a block diagram of a schematic structure of the electronic piano.

FIG. 4 shows a structure example of the electronic musical instrument to realize the functions as described above. In FIG. 4, 1 denotes a CPU, 2 a ROM, 3 a RAM, 4 an LCD, 5 an internal bus, 6 a key scan circuit, 7 a keyboard, 8 a panel scan circuit, 9 a panel SW and LED, 10 a musical sound generator (tone generator), 11 a D/A converter, 12 an analog signal processor, 13 an amplifier, and 14 a speaker respectively.

A controller of the electronic piano 100 in this embodiment consists of the CPU 1, the ROM 2, and the RAM 3, and in the ROM 2 display data 2a for the help function is stored. In the ROM 2, various data such as a program for operating the CPU 1, automatic performance data, parameter data on timbre, demo music data, character code sequence data, audio (voice) code sequence data, identification code –>function –>blinked LED corresponding data described later, and so on are also stored. The RAM 3 is used as a work area for the CPU 1 to operate, and is used, for example, as a register for storing the present panel state.

The key scan circuit 6 detects a key depression (key on) event and a key release (key off) event of the keyboard 7, and the panel scan circuit 8 detects the on/off states of the switches and the operation states of the LEDs by scanning the panel SW and LED 9.

Figure 5:
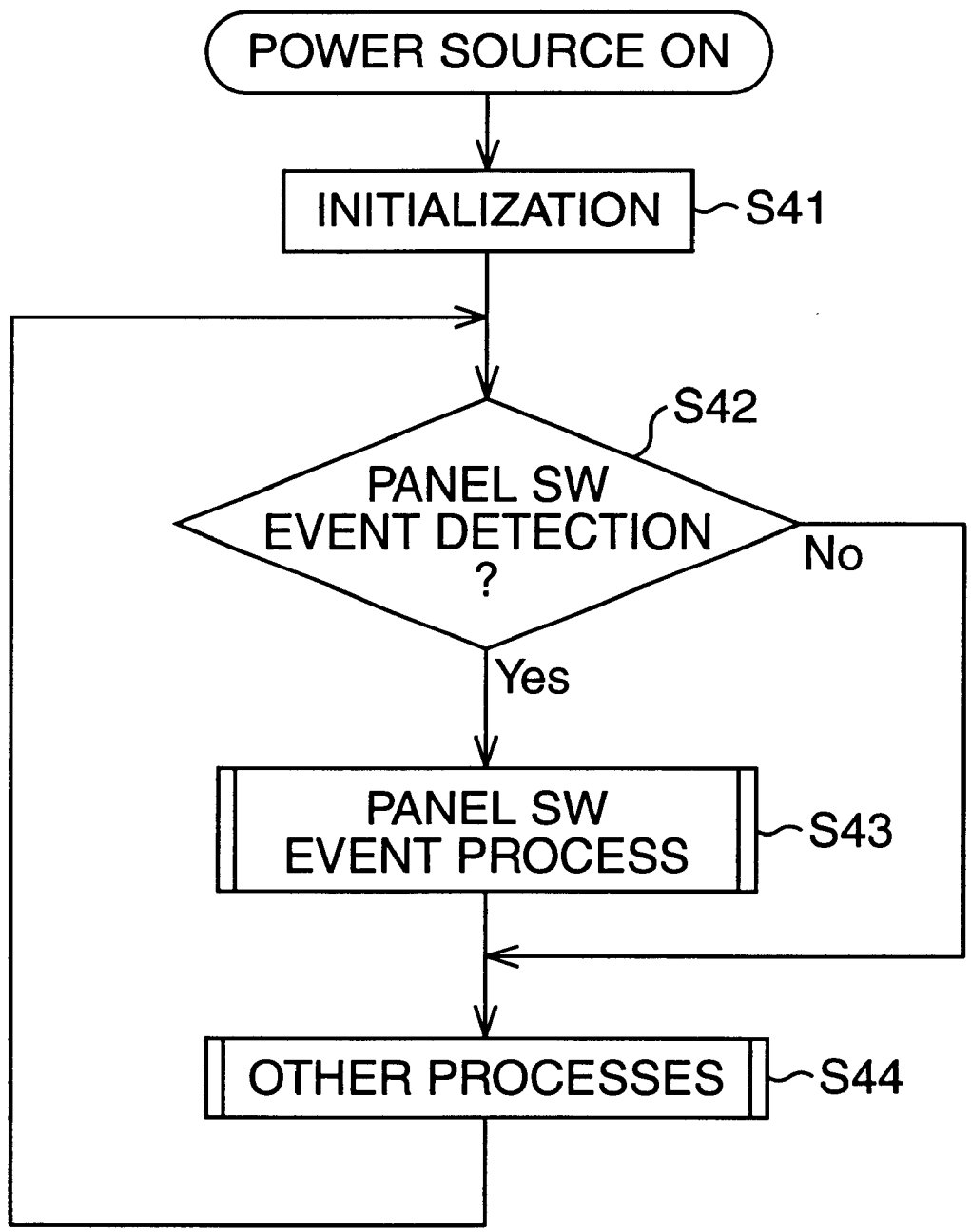
FIG. 5 is a flow chart showing the main routine in the electronic piano.

FIG. 5 shows a main routine of the process performed in the electronic piano 100 according to this embodiment. As shown in FIG. 5, when a power source is turned on, initialization is performed in a first step S41 to delete a storage content existing on a disc or a memory, and return it to the original state.

Then, a step S42 is carried out, where an event detection of a panel switch is performed. When an event is not detected as a result of this detection process, the procedure jumps to a step S44, where other processes are carried out, and after that the procedure returns to the step S42, where the event detection process of the panel switch is carried out again.

Meanwhile, when an event is detected as a result of the event detection process of the panel switch in the step S42, the procedure advances to a step S43, where a panel switch event process is carried out.

Figure 6:
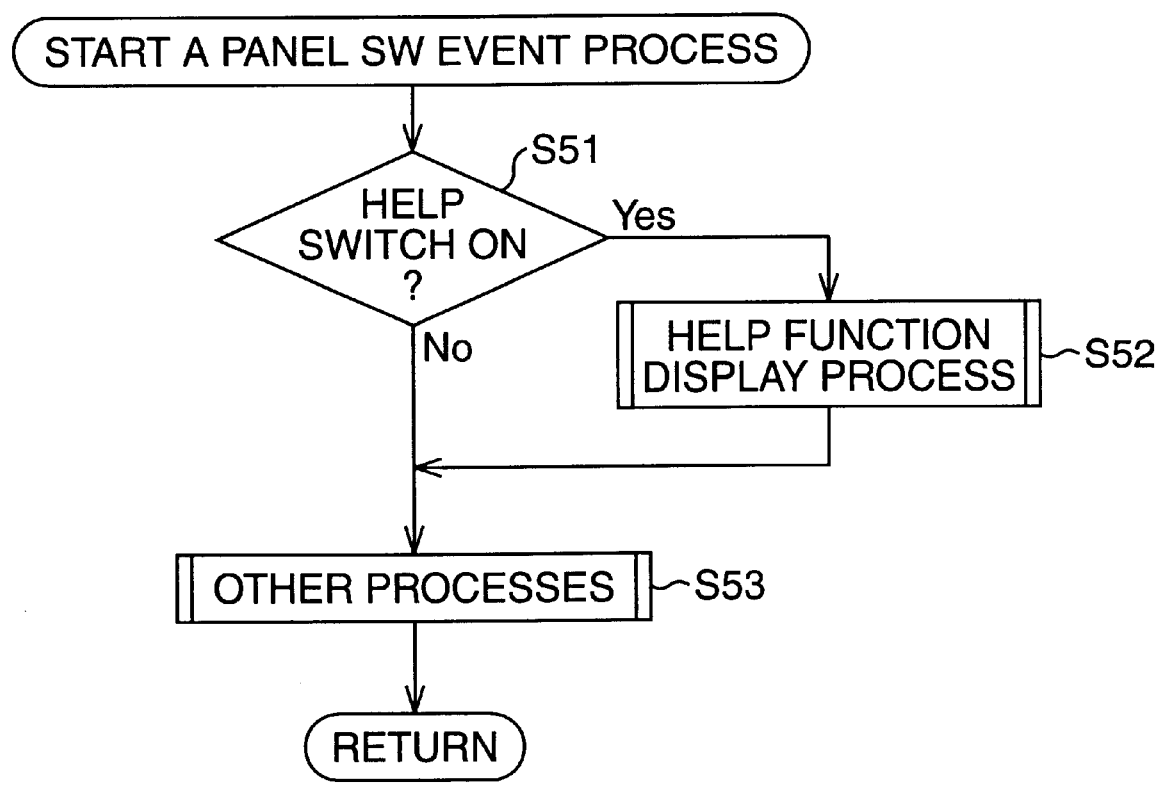
FIG. 6 is a flow chart showing an example of a panel switch event process performed in this embodiment.

As for the process performed in the step S43, as shown in a flow chart in FIG. 6, a judgment if the help switch 37 is turned on or not is first performed in the first step S51. When the help switch 37 is turned on as a result of this judgment, the procedure advances to a step S52, where a help function display process is performed, and then proceeds to a step S53, where other processes are carried out. When the help switch 37 is not turned on, the procedure advances directly to the step S53, where other processes are carried out.

Figure 7:
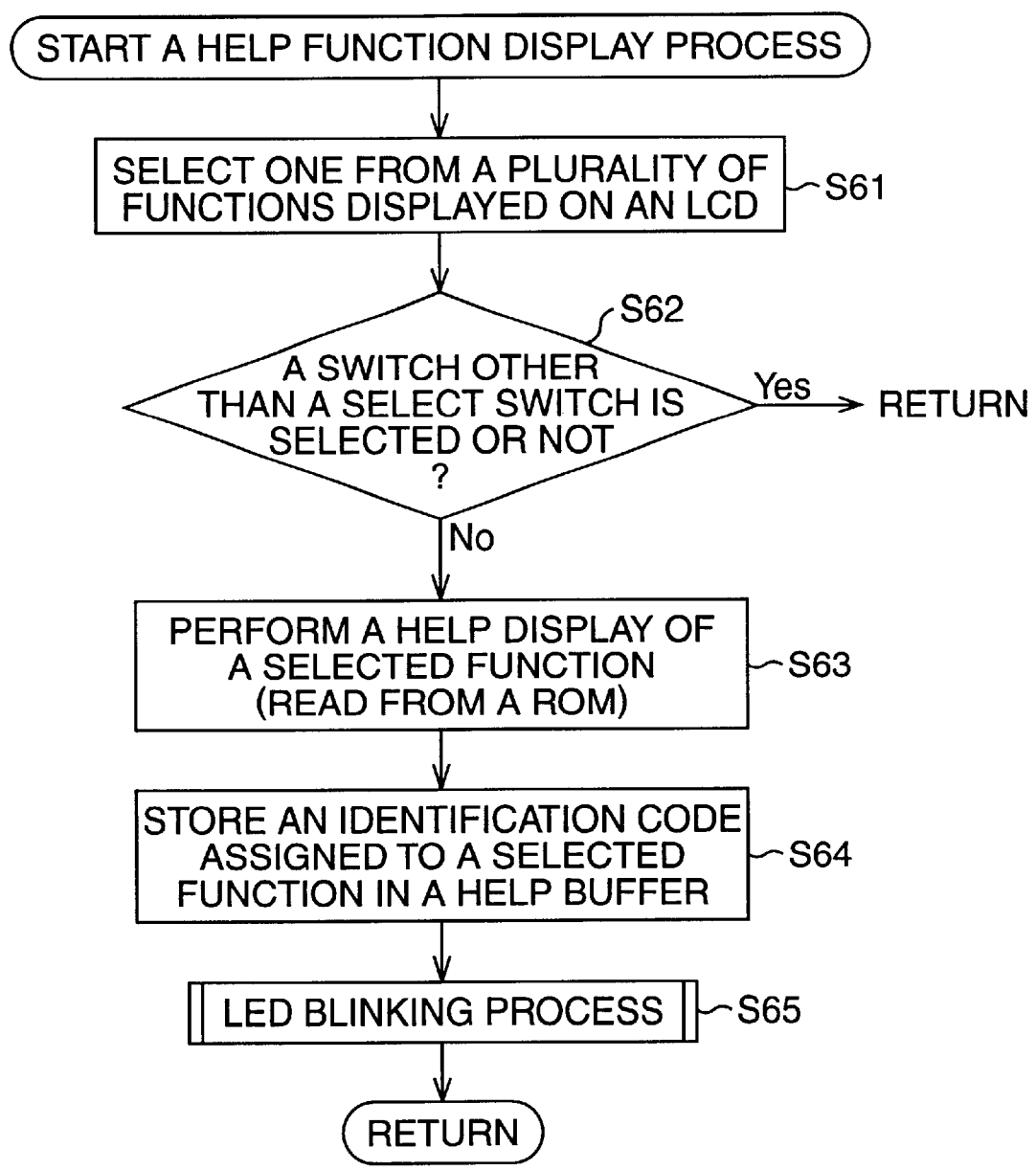
FIG. 7 is a flow chart showing a procedure of displaying a help function.

FIG. 7 is a flow chart showing a procedure for the help function display process in the electronic piano 100 according to this embodiment.

In this embodiment, as shown in FIG. 7, when the help function display process starts, a plurality of help functions are displayed on the display device 21 in the first step S61. A user selects a desired help function from the plural help functions displayed. The selection of the help function is, as described above, is performed by operating the select button 22 and the dial 23.

When a switch operation by a user is detected, the procedure then advances to a step S62, where a judgment is performed whether a switch other than a select switch is operated or not. When the result of this judgment shows that a switch other than the select switch is operated, a help display is not performed and the procedure returns to the main routine.

When the result of the judgment in the step S62 shows that a switch other than the select switch is not operated, that is, the select switch is operated, the procedure goes to a step S63, where data for performing the help display is read from the ROM 2 to perform the help display of the selected function.

Next, the procedure goes to a step S64, where an identification code (detailed in FIG. 9) assigned for the selected function is read, and then in the step S65 a process for blinking an LED corresponding to the identification code read is carried out.

Figure 8:
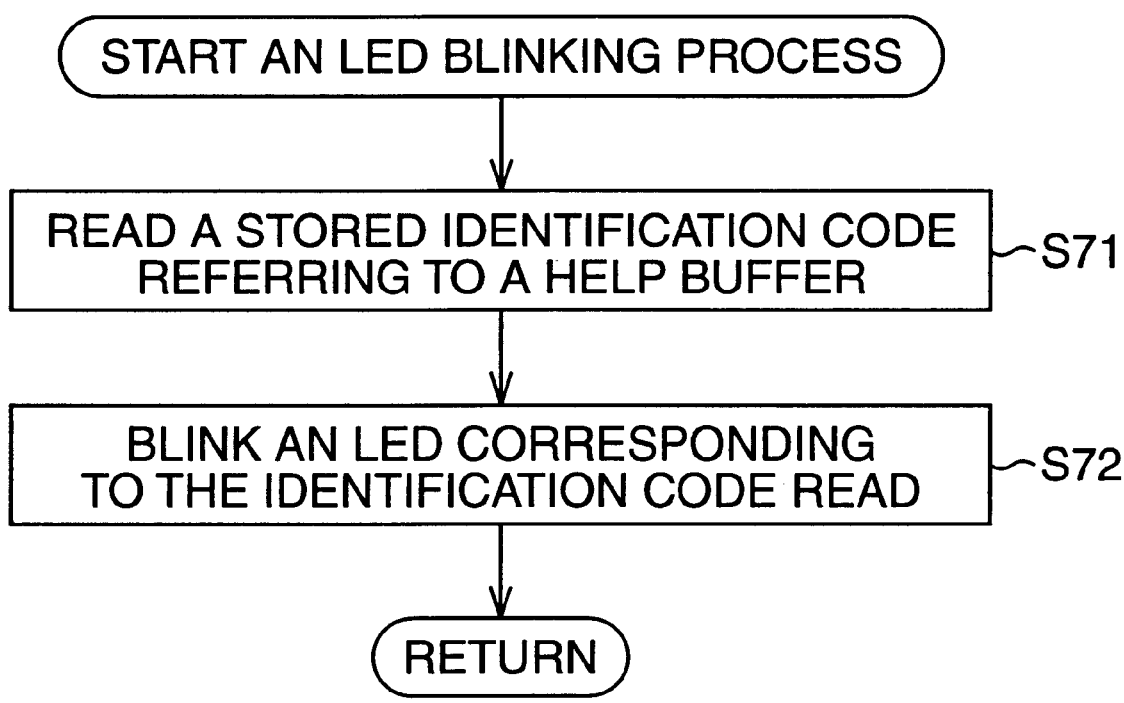
FIG. 8 is a flow chart explaining a process of blinking a light-emitting diode (LED)

FIG. 8 is a flow chart describing the LED blinking process performed in the step S65 in FIG. 7.

As shown in FIG. 8, when the process starts, the identification code stored is read referring to a help buffer in a first step S71.

Next, the procedure advances to a step S72, where the process of blinking the LED corresponding to the identification code read in the step S71 is performed.

In this case, since one function is not always performed by only one operation element, only one LED is not always blinked. A tempo function, for example, is performed either by an up switch or a down switch, and therefore, when an explanation for a tempo is demanded in the help function, an LED corresponding to the up switch and an LED corresponding to the down switch are both blinked.

FIG. 9 shows how identification codes, functions, and blinked LEDs are corresponding to each other. In this embodiment, as shown in FIG. 9, an example using 128 kinds of the identification codes, from "000" to "127", is shown.

Figure 2:
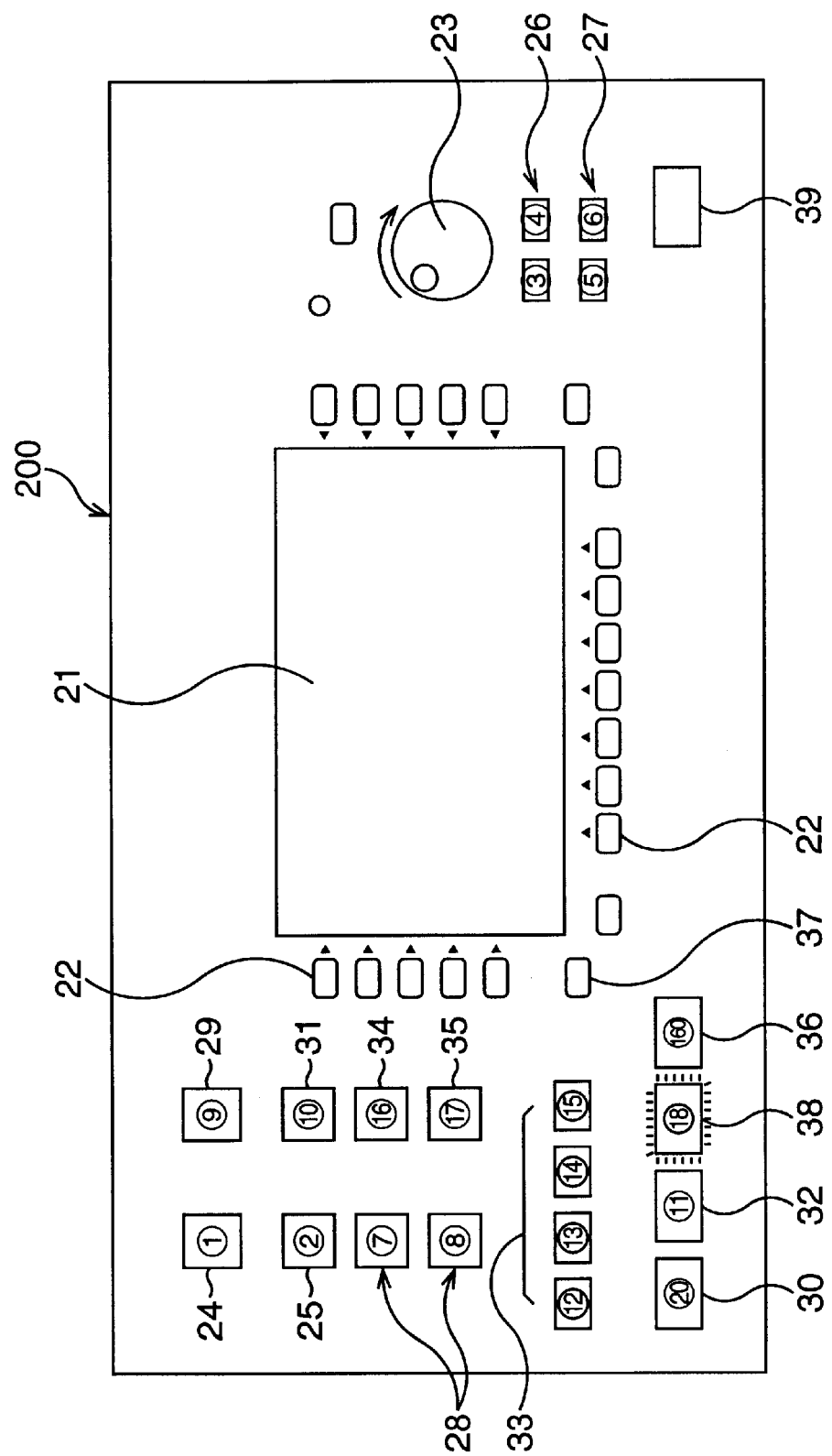
FIG. 2 is a view showing an example of an operation panel provided in the electronic piano according to this embodiment.

As they correspond to each other as shown in FIG. 9, when "a demo help function" is selected, for example, an LED 1 is blinked while an explanation text for it is displayed on the display area 201. In this way, a demo switch 24 corresponding to the LED 1 can be recognized visually at once as shown in FIG. 2. Therefore, in the electronic piano 100 according to this embodiment, a user is free from the trouble of finding an operation element to shorten the time required for the operation of having a function performed.

In the same way, when a metronome function is selected, an LED 2 is blinked while an explanation text for it is displayed on the display area 201, so that the location of a metronome switch 25 can easily be known. Similarly, when a transpose function is selected, an LED 3 and an LED 4 are blinked while an explanation text for it is displayed on the display area 201, so that the location of a transpose switch 26 can easily be known.

In case of a transposition, since transposition directions to both the plus side and the minus side are possible, two switches are provided as the transpose switch 26 while an explanation text for it is displayed on the display area 201.

Similarly, in case of an octave shift, shift directions to both the plus side and the minus side are possible, and therefore when an octave shift function is selected, an LED 5 and an LED 6 are blinked while an explanation text for it is displayed on the display area 201, so that the locations of two switches composing an octave shift switch 27 can easily be known.

When a tempo function is selected, an LED 7 and an LED 8 are blinked while an explanation text for it is displayed on the display area 201, so that the locations of two switches for a tempo switch 28 can easily be known. When an effect function is selected, an LED 9 is blinked while an explanation text for it is displayed on the display area 201, so that the location of an effect switch 29 can easily be known.

When a tuning function is selected, the LED 9 and an LED 20 are blinked while an explanation text for it is displayed on the display area 201. The LED 20 is an LED disposed corresponding to a function key 30, and therefore, by pressing both of the effect switch 29 and the function key 30 simultaneously, the tuning function can be performed in this case.

When a chorus function is selected, an LED 10 is blinked while an explanation text for it is displayed on the display area 210, so that the location of a chorus switch 31 can easily be known. When a local control function is selected, the LED 10 and the LED 20 are blinked while an explanation text for it is displayed on the display area 201, so that it is easily recognized that a local control function is performed by pressing two switches, the chorus switch 31 and the function key 30, at the same time.

In the same way, when a harmony function is selected, an LED 11 is blinked while an explanation text for harmony is displayed on the display area 201, so that the corresponding switch 32 can be immediately recognized.

Since fill-ins of four different patterns can be inserted in this embodiment, when a fill-in function is selected, four LEDs, an LED 12 to an LED 15, corresponding to four switches denoted by a numeral 33 are blinked, while an explanation text is displayed on the display area 201.

Furthermore, when a system function is selected, an LED 16 blinks to have a system switch 34 located, while an explanation text for it is displayed on the display area 201, and when a help function of a disc is selected, an LED 17 blinks so that the location of a disc switch 35 can easily be known.

In the same way, when a function of switching function (shift key) is selected, the LED 20 blinks while an explanation text for it is displayed on the display area 201. When a song select function is selected, an LED 160 blinks while an explanation text for it is displayed on the display area 201, so that the location of a song select switch 36 can easily be known. Note that an example where LEDs 1 to 160 are operated to blink is shown in the above embodiment, they may be operated to light.

According to this embodiment, as described above, when a function is selected, an explanation for the selected function is displayed in text, and at the same time, an LED disposed corresponding to a switch for performing the selected function is operated to blink or light, so that a user can recognize the position of a desired operation element visually, which eliminates the trouble of finding the operation element to greatly enhance operation efficiency at the time various functions provided in the electronic musical instrument are performed.

Second Embodiment

FIG. 1 is an appearance view of an electronic piano showing an example of an electronic musical instrument according to the second embodiment of the present invention, as well as to the first embodiment.

As shown in FIG. 1, the operation panel 200 is provided in an upper front section of the electronic piano 100 in this embodiment. On the operation panel 200 the display device 21 composed of the LCD and many operation elements are arranged to provide many functions as shown in a detailed explanatory view in FIG. 2. Therefore, in order to make efficient use of these functions, the help function is provided in the electronic piano 100 in this embodiment.

The help function can transfer a mode to the help operation mode when the help switch 37 is pressed. In other words, when the help switch 37 is pressed, the function list is displayed on the screen of the display device 21. When the function list is displayed on the screen, the select button 22 or dial 23 is operated to select a desired function.

Figure 10:
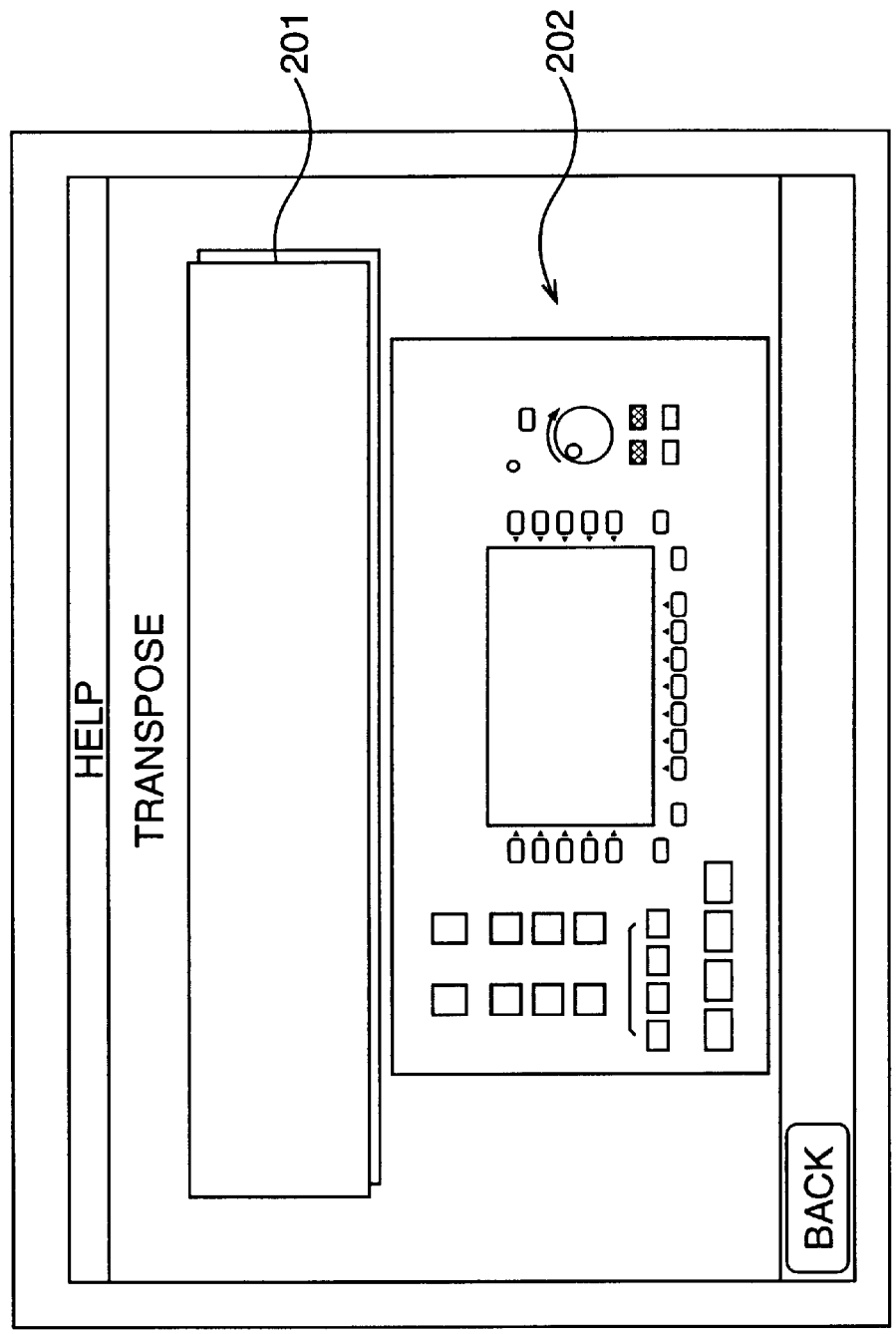
FIG. 10 is a view showing a display example of a display device.

When a function is selected from the plural functions displayed on the display device 21 by the operation of the select button 22 or dial 23, an explanation for a (transpose) function is displayed in text in an upper part of the screen 201 of the display device 21 as shown in FIG. 10.

The process so far is a help function display conventionally performed in general, but in this embodiment, when a panel view switch 39 is operated while the help function display is performed in the upper part of the screen 201 of the display device 21, an operation panel view image is displayed on a lower part of the screen 202.

In an example shown in FIG. 10, the transpose switch 26 is displayed on the panel view image in a different color from that of other switches. In this way, a user can know the location of the corresponding function switch visually, so that the trouble of finding a desired operation element is eliminated in the electronic musical instrument with many operation switches disposed therein.

FIG. 4 shows a structure example of the electronic musical instrument to realize the functions as described above. In FIG. 4, 1 denotes the CPU, 2 the ROM, 3 the RAM, 4 the LCD, 5 the internal bus, 6 the key scan circuit, 7 the keyboard, 8 the panel scan circuit, 9 the panel SW and LED, 10 the musical sound generator (tone generator), 11 the D/A converter, 12 the analog signal processor, 13 the amplifier, and 14 the speaker respectively.

The controller of the electronic piano 100 in this embodiment consists of the CPU 1, the ROM 2, and the RAM 3, and in the ROM 2 the display data 2a for the help function and panel view display data 2b are stored. In the ROM 2, various data such as the program for operating the CPU 1, the automatic performance data, the parameter data on timbre, the demo music data, the character code sequence data, the audio code sequence data, and so on are also stored. The RAM 3 is used as a work area for the CPU 1 to operate, and is used, for example, as a register for storing the present panel state.

The key scan circuit 6 detects a key depression event and a key release event of the keyboard 7, and the panel scan circuit 8 detects the on/off states of the switches by scanning the panel SW 9.

FIG. 5 shows the main routine of the process performed in the electronic piano 100 according to this embodiment as well as to the first embodiment. As shown in FIG. 5, when the power source is turned on, initialization is performed in the first step S41 to delete a storage content existing on a disc or a memory and return it to the original state.

Then, the step S42 is carried out, where the event detection of the panel switch is performed. When an event is not detected as a result of this detection process, the procedure jumps to the step S44, where other processes are carried out, and after that the procedure returns to the step S42, where the event detection process of the panel switch is carried out again.

Meanwhile, when an event is detected as a result of the event detection process of the panel switch in the step S42, the procedure advances to the step 43, where the panel switch event process is carried out.

Figure 11:
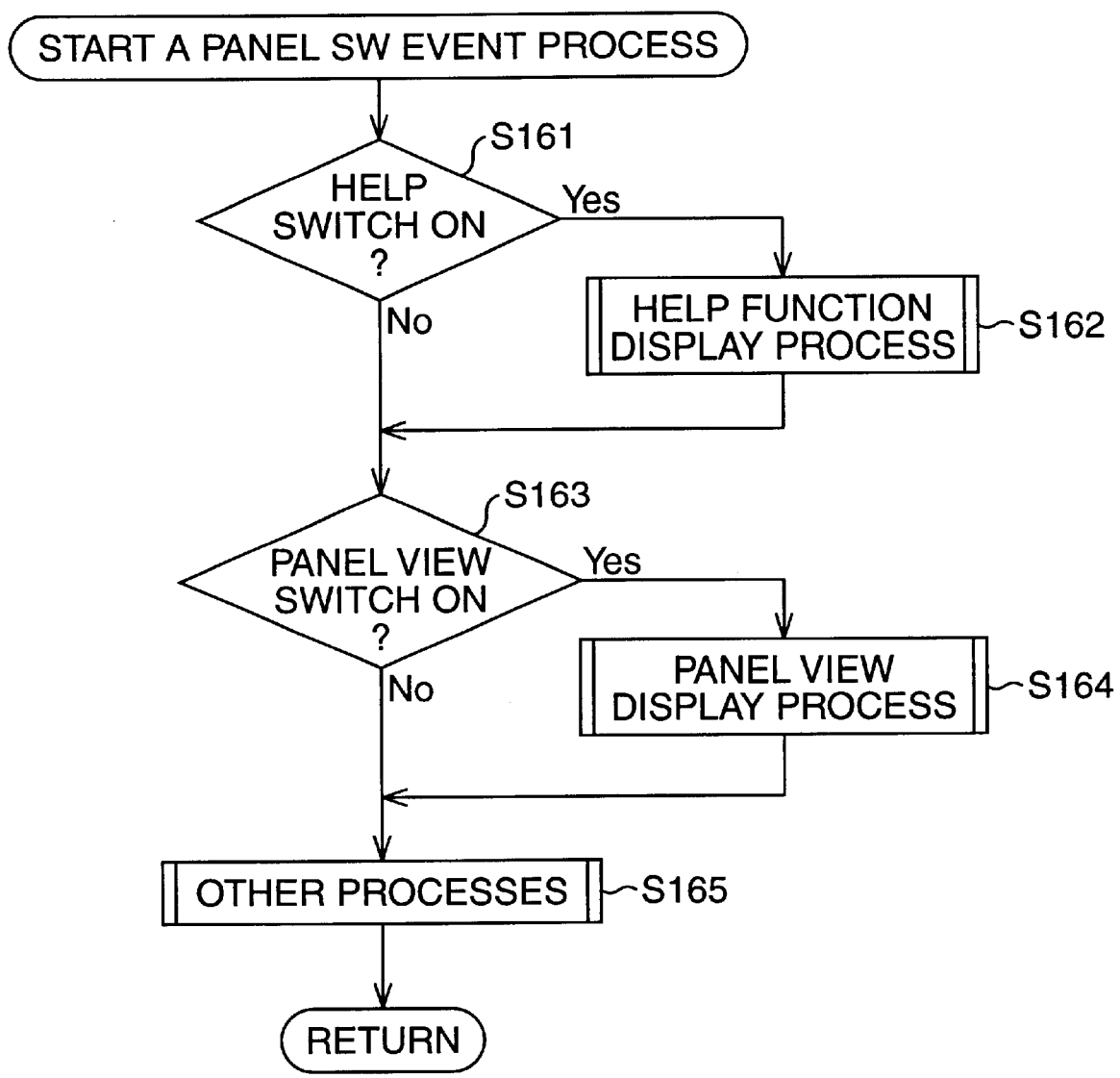
FIG. 11 is a flow chart showing an example of a panel switch event process performed in this embodiment.

As for the panel switch event process performed in the step S43, as shown in a flow chart in FIG. 11, a judgment whether the help switch 37 is turned on or not is first performed in a first step S161. When the help switch 37 is turned on as a result of this judgment, the procedure advances to a step S162, where the help function display process is performed.

When the help switch 37 is not turned on as a result of the judgment in the step S161, and after the help function display process in the step S162 is performed, the procedure advances to a step S163, where a judgment is performed whether the panel view switch is turned on or not. When the result of the judgment shows that the panel view switch is turned on, the procedure advances to a step S164, where a panel view display process is carried out, and then advances to a step S165, where other processes are carried out. When the result of the judgment in the step S163 shows that the help switch 37 is not turned on, the procedure advances directly to the step S165 to carry out other processes.

Figure 12:
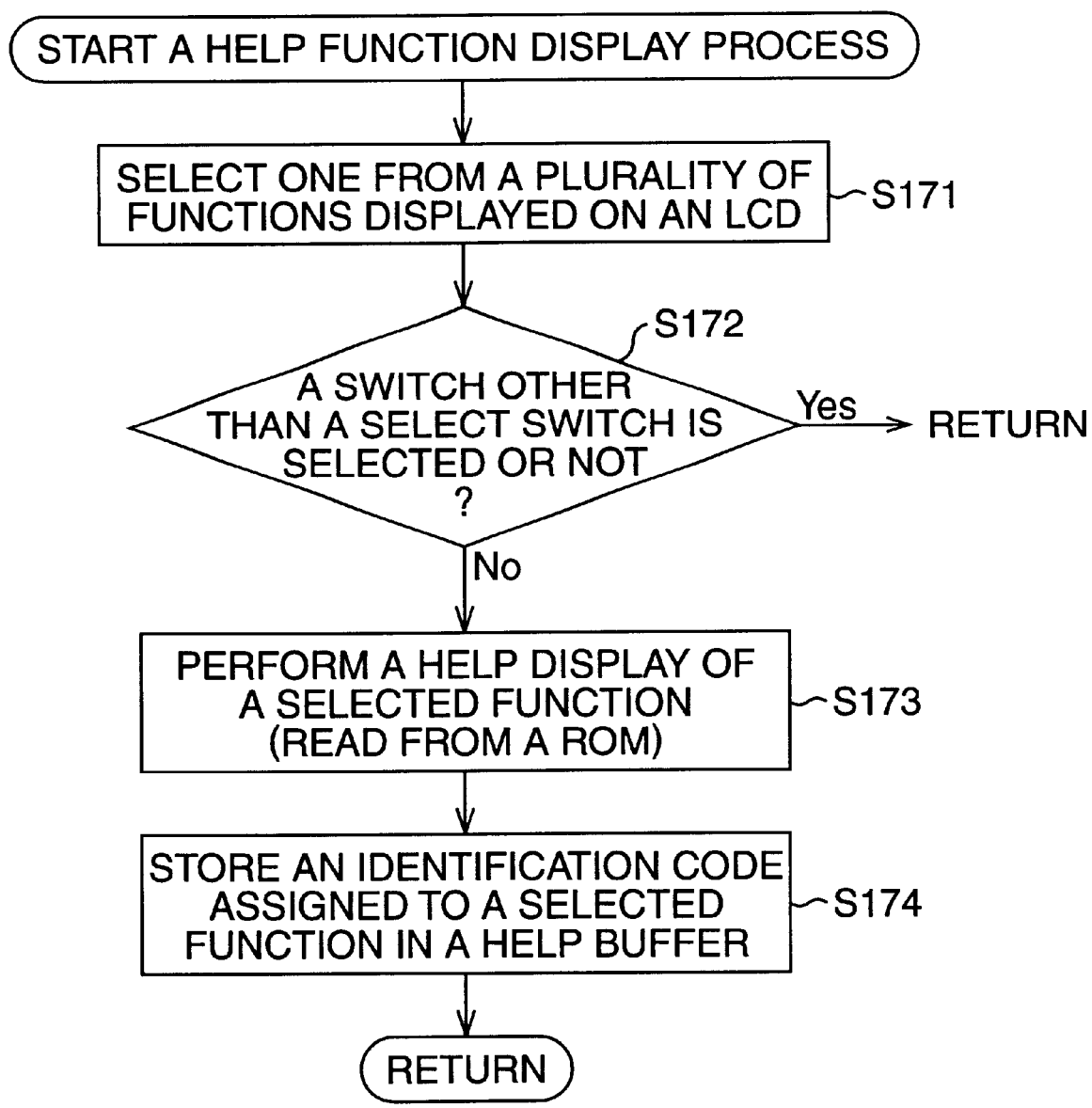
FIG. 12 is a flow chart showing a procedure of displaying a help function.

FIG. 12 is a flow chart showing a procedure for a help function display process in the electronic piano 100 according to this embodiment.

In this embodiment, as shown in FIG. 12, when the help function display process starts, the plural help functions are displayed on the display device 21 in a first step S171. A user selects a desired help function from a plurality of help functions displayed. The selection of the help function is, as described above, is performed by operating the select button 22 and the dial 23.

When a switch operation by a user is detected, the procedure then advances to a step S172, where a judgment whether a switch other than the select switch is operated or not is performed. When the result of this judgment shows that a switch other than the select switch is operated, the help display is not performed and the procedure returns to the main routine.

When the result of the judgment in the step S172 shows that a switch other than the select switch is not operated, that is, the select switch is operated, the procedure goes to a step S173, where data for performing the help display is read from the ROM 2 to perform the help display of the selected function. Next, the procedure goes to a step S174, where the process of reading an identification code (detailed in FIG. 14) assigned for the selected function and storing it in the help buffer is carried out.

Figure 13:
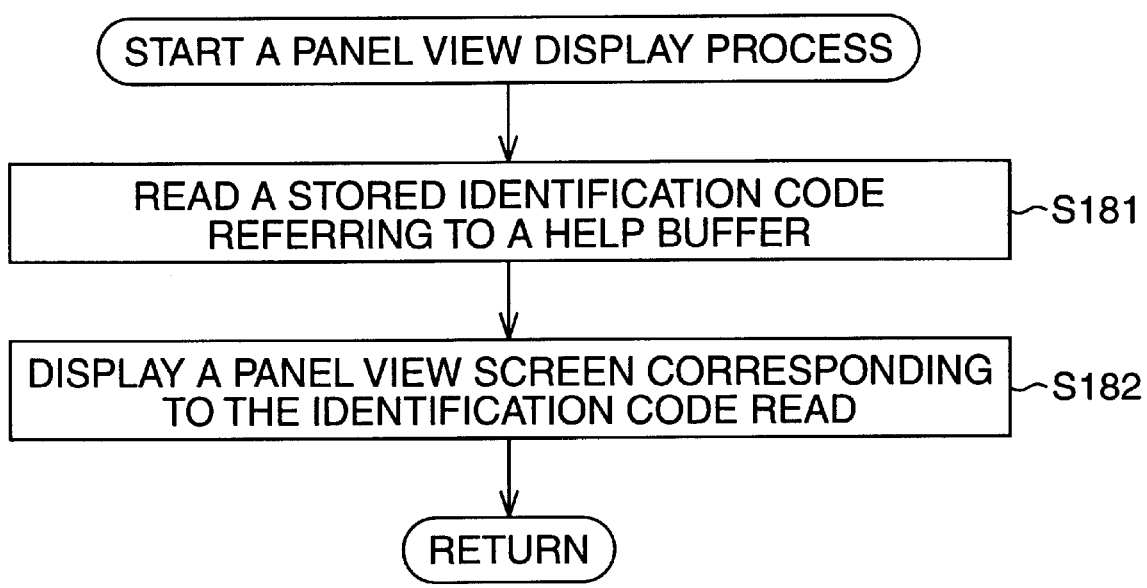
FIG. 13 is a flow chart explaining a content of a panel view display process.

FIG. 13 is a flow chart describing the panel view display process carried out in the step S164 in FIG. 11.

As shown in FIG. 13, when the process starts, the identification code stored is read in a first step S181 referring to the help buffer.

Next, the procedure advances to a step S182, where a panel view screen corresponding to the identification code read in the step S181 is displayed. On this screen display, a switch for performing the function selected for the help display is displayed in a different color from that of other switches.

In this case, since one function is not always performed by only one operation element, only one switch is not always displayed in a different color. The tempo function, for example, is operated either by the up switch or the down switch, and therefore, when an explanation for a tempo is demanded in the help function, the up switch and the down switch are both displayed in a different color.

FIG. 14 shows how identification codes and functions correspond to each other. In this embodiment, as shown in FIG. 14, an example using 128 kinds of the identification codes, from "000" to "127", is shown.

As they correspond to each other as shown in FIG. 14, when "the demo help function" is selected, for example, the explanation text for it is displayed on the upper part of the screen 201. When the panel view switch 39 is operated while the selected function is explained, the panel view screen is displayed on the lower part of the screen 202. In this way, the location of the demo switch 24 can be known visually at once as shown in FIG. 2. Therefore, in the electronic piano 100 according to this embodiment, a user is free from the trouble of finding an operation element to shorten the time required for the operation of having a function performed. Note that when the panel view switch 39 is operated, only the panel view screen may be displayed all over the screen, the upper part of the screen 201 not displayed.

Alternatively, the explanation text and the panel view screen may be displayed simultaneously at the time "the demo help function" is selected, or in case the explanation text and the panel display screen are simultaneously displayed, only the panel view screen may be displayed when the panel view switch is operated.

Furthermore, when the panel view screen is too small for a desired function switch to be recognized if the explanation text and the panel view screen are simultaneously displayed on the screen, a function switch section required may be displayed in a magnified state.

In the same way, when the metronome function is selected, the explanation text for it is displayed on the upper part of the screen 201. When the panel view switch 39 is operated while the selected function is explained, the panel view screen is displayed on the lower part of the screen 202, and the switch 25 for performing the metronome function is displayed in a different color, so that the location of the metronome switch 25 can easily be known.

When the transpose function is selected, the explanation text for it is displayed on the upper part of the screen 201. When the panel view switch 39 is operated at this time, the switch 26 for performing the transpose function is displayed in a different color, so that the location of the transpose switch 26 can easily be known. Note that since transposition directions to both the plus side and the minus side are possible in case of the transpose function, two switches are disposed as the transpose switch 26.

Similarly, in case of an octave shift, when the help function is selected, the explanation text for it is displayed on the upper part of the screen 201. When the panel view switch 39 is operated while the function selected is explained, the panel view screen is displayed on the lower part of the screen 202. Since shift directions to both the plus side and the minus side are possible in case of an octave shift, the positions of two switches composing the octave shift switch 27 can easily be known when the octave shift function is selected.

When the tempo function is selected, the explanation text for it is displayed on the upper part of the screen 201. When the panel view switch 39 is operated while the selected function is explained, the panel view screen is displayed on the lower part of the screen 202, so that the locations of the two switches for the tempo switch 28 can easily be known.

When the effect function is selected, the explanation text for it is displayed on the upper part of the screen 201. When the panel view switch 39 is operated while the selected function is explained, the panel view screen is displayed on the lower part of the screen 202, and a switch for performing the function is displayed in a different color, so that the location of the effect switch 29 can easily be known.

In the same way, when the tuning function, the chorus function, the local control function, the harmony function, the fill-in function, the system function, the function of switching function (shift key), or the song select function is selected, the explanation text for each of the functions is displayed on the upper part of the screen 201.

When the panel view switch 39 is operated while the help display for each of the functions is performed, the panel view screen is displayed on the lower part of the screen 202, and a switch for performing the function is displayed in a different color, so that location of the switch for performing the function can easily be known. Note that in this embodiment, an example where a corresponding switch is displayed in a different color, but it may inversely be displayed or displayed in a blinking way.

In this embodiment, as described above, when a function is selected, an operation element image is displayed and a switch for performing the function is displayed in a different color while an explanation for the selected function is displayed in text, so that the position of a desired operation element can be recognized visually by a user, and thereby the trouble of finding an operation element is eliminated to enhance the operation efficiency greatly when various functions provided in the electronic musical instrument are performed.

In addition, according to other characteristics of this embodiment, a function for displaying the panel view screen in a magnified state on user's demand is provided so that the corresponding operation element can easily be found on the screen.

By supplying software program codes for realizing the functions in the embodiments to the computer inside the apparatus or the system, which is connected with various devices, in order to operate various devices described above to realize the above-described functions in the embodiments, the devices of various kinds may be operated according to the programs stored in the computer (a CPU or an MPU) in the system or the apparatus.

In this case, since the software program codes themselves realize the functions described above in the embodiments, the program codes themselves and means for supplying the program codes to the computer, such as a storage medium for storing such program codes, constitute the embodiments. As the storage medium for storing such program codes, a floppy disc, a hard disc, an optical disc, a magneto-optical disc, a CD-ROM, a magnetic tape, a non-volatile memory card, a ROM, and so on can be used.

The functions in the embodiments described above can be realized not only by a computer's performance of the supplied program codes, but when the program codes realize the functions described in the above embodiments in cooperation with an OS (operating system), or other application software, or the like, operating in the computer, it is understood that such program codes are included in the embodiments of the present invention.

Furthermore, after the supplied program codes are stored in an memory included in a function expansion board of the computer or a function expansion unit connected to the computer, the CPU and so on included in the function expansion board or the function expansion unit may perform a part or all of the practical processes based on the instruction of the program codes to realize the functions in the embodiments described above.

Note that the above embodiments are to be considered only as illustrative of materializing the present invention, and not as restrictive of the technical scope of the present invention. In other words, the present invention may be embodied in other specific forms without departing from the technical sprit or the essential characteristics thereof.

What is claimed is:

1. A function guide system in an electronic musical instrument, comprising:

help display means for displaying on a display device a panel view screen showing a text and the arrangement of operation elements of a panel when an explanation for a function selected for a help display is performed;

a display controller for differentiating the display state of said operation element for performing the selected function from the display state of other operation elements; and panel view display means for displaying said panel view screen in a magnified state.

2. A function guide system in an electronic musical instrument according to claim 1, wherein the display state of said operation element is differentiated from the display state of other operation elements by differentiating the display color of said operation element for performing the function selected for said help display from the display color of others.

3. A function guide system in an electronic musical instrument according to claim 1, wherein the display state of said operation element is differentiated from the display state of other operation elements by blinking the display of said operation element for performing the function selected for said help display.

4. A function guide system in an electronic musical instrument, the system comprising:

help function display means for displaying a plurality of help functions provided in said electronic musical instrument on a screen of a display device;

function selection means for selecting a desired help function from the plural help functions displayed on the screen of the display device by said help function display means;

help content display means for performing the explanation for the help function selected by said function selection means; in text on the display device;

panel view dislay means for displaying a panel view screen showing the arrangement of operation elements of a panel, and displaying said operation element for the function displayed on a help display in a different display state from the display state of other operation elements, when a panel view switch is operated while said help display is performed by said help content display means;

help data storage means for storing text data and image data for explaining the help content in a storage medium; and wherein an explanation for a function selected for a help display is displayed in text, and when a predetermined operation is performed while said help display is performed, a panel view screen for showing the arrangement of operation elements of a panel is displayed and the display state of said operation element for performing the selected function is differentiated from the display state of other operation elements.

5. A function guide system in an electronic musical instrument according to claim 4, wherein the display state of said operation element is differentiated from the display state of other operation elements by differentiating the display color of said operation element for performing the function selected for said help display from the display color of others.

6. A function guide system in an electronic musical instrument according to claim 4, wherein said display state of said operation element is differentiated from the display state of other operation elements by blinking the display of said operation element for performing the function selected for said help display.

7. A function guide system in an electronic musical instrument having a help function, comprising:

help function display means for displaying a plurality of help functions provided in said electronic musical instrument on a screen of a display device;

function selection means for selecting a desired help function from the plural help functions displayed on the screen of the display device by said help function display means;

help content display means for performing the explanation for the help function selected by said function selection means in text on the display device;

panel view display means for displaying a panel view screen showing the arrangement of operation elements of a panel, and displaying said operation element for the function displayed on a help display in a different display state from the display state of other operation elements, when a panel view switch is operated while said help display is performed by said help content display means; and help data storage means for storing text data and image data for explaining the help content in a storage medium.

8. A function guide system in an electronic musical instrument according to claim 7, wherein the display state of said operation element is differentiated from the display state of other operation elements by differentiating the display color of said operation element for performing the function selected for said help display from the display color of others.

9. A function guide system in an electronic musical instrument according to claim 7, wherein the display state of said operation element is differentiated from the display state of other operation elements by blinking the display of said operation element for performing the function selected for said help display.

10. A function guide system in an electronic musical instrument, the system comprising:

help function display means for displaying a plurality of help functions provided in said electronic musical instrument on a screen of a display device;

function selection means for selecting a desired help function from the plural help functions displayed on the screen of the display device by said help function display means;

help display means for displaying an explanation for the help function selected by said function selection means in text and by means of a panel view screen showing the arrangement of operation elements of a panel, and displaying said operation element corresponding to a function displayed on a help display in a different display state from the display state of other operation elements;

help data storage means for storing data for displaying the help content in text or in image, in a storage medium; and wherein the display state of said operation element is differentiated from the display state of other elements by differentiating the display color of said operation element for performing the function selected for said help display from the display color of others.

11. A function guide system in an electronic musical instrument the system comprising:

help function display means for displaying a plurality of help functions provided in said electronic musical instrument on a screen of a display device;

function selection means for selecting a desired help function from the plural help functions displayed on the screen of the display device by said help function display means;

help content display means for performing the explanation for the help function selected by said function selection means in text on the display device;

panel view display means for displaying a panel view screen showing the arrangement of operation elements of a panel, and displaying said operation element for the function displayed on a help display in a different display state from the display state of other operation elements, when a panel view switch is operated while said help display is performed by said help content display means;

help data storage means for storing text data and image data for explaining the help content in a storage medium;

wherein at the time an explanation for a function selected for a help display is performed, a panel view screen showing a text and the arrangement of operation elements of a panel is displayed on a display screen, and the display state of said operation element for performing the selected function is differentiated from the display state of other operation elements; and wherein the display state of said opration element is differentiated from the display state of other operation elements by blinking the display of said operation element for performing the function selected for said help display.

12. A function guide system in an electronic musical instrument, the system comprising:

help function display means for displaying a plurality of help functions provided in said electronic musical instrument on a screen of a display device;

function selection means for selecting a desired help function from the plural help functions displayed on the screen of the display device by said help function display means;

help display means for displaying an explanation for the help function selected by said function selection means in text and by means of a panel view screen showing the arrangement of operation elements of a panel, and displaying said operation element corresponding to a function displayed on a help display in a different display state from the display state of other operation elements; and help data storage means for storing data for displaying the help content in text or in image, in a storage medium; and wherein the display state of said operation element is differentiated from the display state of other operation elements by blinking the display of said operation element for performing the function selected for said help display.

13. A function guide method of an electronic musical instrument, comprising:

a help display process for displaying on a display device a panel view screen showing a text and the arrangement of operation elements of a panel when an explanation for a function selected for a help display is performed;

a display control process for differentiating the display state of said operation element for performing the selected function from the display state of other operation elements; and a panel view display process for displaying said panel view screen in a magnified state.

14. A storage medium, wherein a program for performing each of the processes according to claim 13 is stored readably from a computer.

15. A function guide method of an electronic musical instrument, the method comprising:

a help function display process for displaying a plurality of help functions provided in said electronic musical instrument on a screen of a display device;

a function selection process for selecting a desired help function from the plural help functions displayed on the screen of the display device by said help function display process;

a help content display process for performing an explanation for the help function selected by said function selection process in text on the display device;

a panel view display process for displaying a panel view screen showing the arrangement of operation elements of a panel, and displaying said operation element for the function displayed on a help display in a different display state from the display state of other operation elements, when a panel view switch is operated while said help display is performed by said help content display process; and a help data storage process for storing text data and image data to explain the help content in a storage medium; and wherein an explanation for a function selected for a help display is displayed in text, and when a predetermined operation is performed while said help display is performed, a panel view screen for showing the arrangement of operation elements of a panel is displayed, and the display state of said operation element for performing the selected function is differentiated from the display state of other operation elements.

16. A storage medium, wherein a program for performing each of the processes according to claim 15 is stored readably from a computer.

17. A function guide method of an electronic musical instrument having a plurality of help functions, comprising:

a help function display process for displaying a plurality of help functions provided in said electronic musical instrument on a screen of a display device;

a function selection process for selecting a desired help function from the plural help functions displayed on the screen of the display device by said help function display process;

a help content display process for performing an explanation for the help function selected by said function selection process in text on the display device;

a panel view display process for displaying a panel view screen showing the arrangement of operation elements of a panel, and displaying said operation element for the function displayed on a help display in a different display state from the display state of other operation elements, when a panel view switch is operated while said help display is performed by said help content display process; and a help data storage process for storing text data and image data to explain the help content in a storage medium.

18. A storage medium, wherein a program for performing each of the processes in claim 17 is stored readably from a computer.

* * * * *